United States Patent
Shin et al.

(10) Patent No.: US 10,046,616 B2
(45) Date of Patent: Aug. 14, 2018

(54) AIR CONDITIONING SYSTEM FOR VEHICLE

(71) Applicant: Hyundai Motor Company, Seoul (KR)

(72) Inventors: Gee Young Shin, Suwon-si (KR); Keon Soo Jin, Ulsan (KR); Dae Ig Jung, Suwon-si (KR); June Kyu Park, Hwaseong-si (KR); Dong Ho Kwon, Bonghwa-eup (KR)

(73) Assignee: Hyundai Motor Company, Seoul (KR)

( * ) Notice: Subject to any disclaimer, the term of this patent is extended or adjusted under 35 U.S.C. 154(b) by 23 days.

(21) Appl. No.: 15/351,857

(22) Filed: Nov. 15, 2016

(65) Prior Publication Data

US 2018/0001732 A1    Jan. 4, 2018

(30) Foreign Application Priority Data

Jul. 4, 2016    (KR) .......................... 10-2016-0084348

(51) Int. Cl.
*B60H 1/00* (2006.01)
*B60H 1/22* (2006.01)
*B60H 1/32* (2006.01)

(52) U.S. Cl.
CPC ..... *B60H 1/00021* (2013.01); *B60H 1/00057* (2013.01); *B60H 1/00842* (2013.01); *B60H 1/00899* (2013.01); *B60H 1/22* (2013.01); *B60H 1/3204* (2013.01); *B60H 2001/006* (2013.01); *B60H 2001/00135* (2013.01); *B60H 2001/00178* (2013.01)

(58) Field of Classification Search
CPC .... B60H 1/00021; B60H 1/3204; B60H 1/22; B60H 1/00842; B60H 2001/00135; B60H 2001/006
See application file for complete search history.

(56) References Cited

U.S. PATENT DOCUMENTS 5,934,988 A * 8/1999 Fischer .............. B60H 1/00028
                                                454/121
6,352,102 B1 * 3/2002 Takechi ............. B60H 1/00064
                                                165/203

(Continued)

FOREIGN PATENT DOCUMENTS

JP    2012-201277 A    10/2012
JP    5117944 B2        1/2013

(Continued)

*Primary Examiner* — Kun Kai Ma
(74) *Attorney, Agent, or Firm* — Morgan, Lewis & Bockius LLP

(57) ABSTRACT

An air conditioning system for a vehicle may include a cooling duct provided with a cooling duct inlet at a first end of the cooling duct, and a cooling duct indoor outlet and a cooling duct outdoor outlet at a second end of the cooling duct, a heating duct provided with a heating duct inlet at a first end of the heating duct, and a heating duct indoor outlet and a heating duct outdoor outlet at a second end of the heating duct, and including a condenser disposed in the heating duct, an extension duct extending from both the cooling duct indoor outlet and the heating duct indoor outlet, and channeling air supplied from both the cooling duct indoor outlet and the heating duct indoor outlet to a passenger compartment, and a passage control door provided at an indoor outlet end portion of a partition wall.

6 Claims, 3 Drawing Sheets

(56) References Cited

U.S. PATENT DOCUMENTS

| | | | |
|---|---|---|---|
| 2004/0074244 A1* | 4/2004 | Ichishi | B60H 1/00742 62/186 |
| 2007/0144728 A1* | 6/2007 | Kinmartin | B60H 1/00064 165/204 |
| 2007/0240846 A1* | 10/2007 | Pettitt | B60H 1/00521 165/42 |
| 2009/0193830 A1* | 8/2009 | Yoshioka | B60H 1/0005 62/239 |
| 2011/0120146 A1* | 5/2011 | Ota | B60H 1/00885 62/3.3 |
| 2013/0042637 A1* | 2/2013 | Richter | B60H 1/00057 62/79 |
| 2013/0333406 A1* | 12/2013 | Takahashi | B60H 1/00921 62/238.7 |
| 2014/0034266 A1* | 2/2014 | Tabei | B60H 1/00764 165/42 |
| 2014/0075973 A1* | 3/2014 | Graaf | B60H 1/00328 62/115 |
| 2014/0075974 A1* | 3/2014 | Klein | B60H 1/3202 62/119 |
| 2014/0075975 A1* | 3/2014 | Graaf | B60H 1/00007 62/119 |
| 2015/0082820 A1* | 3/2015 | Takahashi | B60H 1/0005 62/238.7 |
| 2015/0273976 A1* | 10/2015 | Enomoto | B60K 6/22 165/202 |
| 2015/0343882 A1* | 12/2015 | Satzger | B60H 1/00778 165/202 |
| 2015/0360537 A1* | 12/2015 | Park | B60H 1/00742 165/203 |
| 2016/0137023 A1* | 5/2016 | Park | B60H 1/00057 165/202 |
| 2016/0161154 A1* | 6/2016 | Park | B60H 1/00021 62/160 |
| 2016/0229258 A1* | 8/2016 | Loup | B60H 1/00064 |
| 2016/0229266 A1* | 8/2016 | Maeda | B60H 1/0005 |
| 2017/0174045 A1* | 6/2017 | Shimauchi | B60H 1/00064 |

FOREIGN PATENT DOCUMENTS

| | | |
|---|---|---|
| JP | 2013-063766 A | 4/2013 |
| JP | 2015-193381 A | 11/2015 |

* cited by examiner

AIR CONDITIONING SYSTEM FOR VEHICLE

CROSS REFERENCE TO RELATED APPLICATION

The present application claims priority to Korean Patent Application No. 10-2016-0084348, filed Jul. 4, 2016, the entire contents of which is incorporated herein for all purposes by this reference.

BACKGROUND OF THE INVENTION

Field of the Invention

The present invention generally relates to a structure of an air conditioning system for a vehicle. More particularly, the present invention relates to a structure of an air conditioning apparatus for a vehicle, the structure allowing effective air conditioning under a predetermined operating condition or in a vehicle equipped with a predetermined power system.

Description of Related Art

Generally, a vehicle is provided with an air conditioning apparatus for cooling and heating a passenger compartment. The air conditioning apparatus aims to maintain the passenger compartment at a pleasant temperature.

A cooler of the air conditioning apparatus for a vehicle generally includes a compressor compressing a refrigerant, a condenser condensing the compressed refrigerant in the compressor, an expansion valve changing the liquefied refrigerant that is condensed by the condenser into a low-temperature and low-pressure refrigerant, and an evaporator cooling air by using latent heat of vaporization of the refrigerant. The cooling system generally lowers the temperature of air and controls absolute humidity.

Heating is performed by using heat from an engine coolant, which is at a high temperature by taking heat from the engine, as a heat source. A heater includes a heater core, and a pump allowing the engine coolant to circulate. The heating system generally raises the temperature of air and controls relative humidity.

In the case of a conventional air conditioning apparatus, cool air is supplied through the cooler, and warm air is supplied through the coolant of an engine, but it may be required to change a structure of the apparatus depending on operating conditions. In particular, in the case of non-engine coolant, it is difficult to configure the conventional air conditioning apparatus, and also the conventional air conditioning apparatus may be inefficient.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a new heat source of an air conditioning apparatus for supplying warmth, and intended to propose an air conditioning apparatus that is optimized to the heat source, thereby improving operation efficiency of the air conditioning apparatus.

Various aspects of the present invention are additionally directed to providing an air conditioning system capable of preventing loss of air volume and noise occurring in response to a size variation between cooling and heating ducts and an extension duct extending to an indoor room in the process of supplying conditioned air to the indoor room.

According to various aspects of the present invention, an air conditioning system for a vehicle may include a cooling duct provided with a cooling duct inlet at a first end of the cooling duct, and a cooling duct indoor outlet and a cooling duct outdoor outlet at a second end of the cooling duct, and including an evaporation core disposed in the cooling duct, a heating duct provided with a heating duct inlet at a first end of the heating duct, and a heating duct indoor outlet and a heating duct outdoor outlet at a second end of the heating duct, and including a condenser disposed in the heating duct, an extension duct extending from both the cooling duct indoor outlet and the heating duct indoor outlet, and channeling air supplied from both the cooling duct indoor outlet and the heating duct indoor outlet to a passenger compartment, and a passage control door provided at an indoor outlet end portion of a partition wall between the cooling duct and the heating duct.

The evaporation core and the condenser, along with a compressor and an expansion valve, may be connected to one refrigerant passage.

The air conditioning system may further include a cooling duct exhaust control door provided between the indoor outlet and the outdoor outlet of the cooling duct, and controlling an outflow amount of cooled air, and a heating duct exhaust control door provided between the indoor outlet and the outdoor outlet of the heating duct, and controlling an outflow amount heated of air.

The cooling duct exhaust control door may be disposed at a junction between the cooling duct and the extension duct, and the heating duct exhaust control door may be disposed at a junction between the heating duct and the extension duct.

When the cooling duct exhaust control door is operated to close the cooling duct indoor outlet and the passage control door is operated to close the cooling duct indoor outlet, the cooling duct exhaust control door in cooperation with the passage control door may close the cooling duct indoor outlet.

When the heating duct exhaust control door is operated to close the heating duct indoor outlet and the passage control door is operated to close the heating duct indoor outlet, the heating duct exhaust control door in cooperation with the passage control door may close the heating duct indoor outlet.

The air conditioning system may further include a controller controlling opening and closing motions of the cooling duct exhaust control door, the heating duct exhaust control door, and the passage control door, in which in a maximum heating mode, the controller may control the passage control door to close the cooling duct indoor outlet, control the cooling duct exhaust control door to close the cooling duct indoor outlet, and control the heating duct exhaust control door to close the heating duct outdoor outlet.

The air conditioning system may further include a controller controlling opening and closing motions of the cooling duct exhaust control door, the heating duct exhaust control door, and the passage control door, in which in a maximum cooling mode, the controller may control the passage control door to close the heating duct indoor outlet, control the heating duct exhaust control door to close the heating duct indoor outlet, and control the cooling duct exhaust control door to close the cooling duct outdoor outlet.

According to the air conditioning system for a vehicle of various embodiments of the present invention, even under the situation where an engine coolant is not supplied or the situation where the engine coolant is at an insufficient temperature, it is possible to configure an air conditioning apparatus for a vehicle having high energy efficiency. Further, without changing a volume of an air conditioning apparatus, it is possible to minimize loss of air volume and occurrence of noise by minimizing a size variation in a passage between the heating and cooling ducts and the extension duct.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
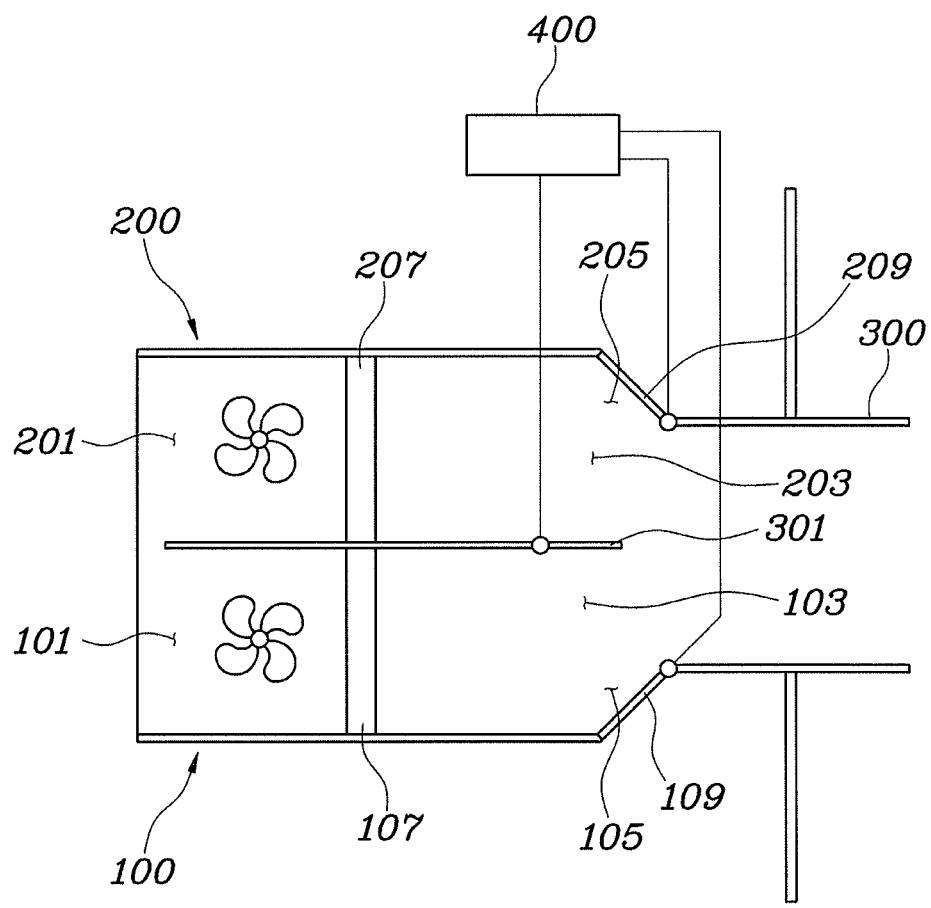
FIG. 1 is a view illustrating a configuration of an air conditioning system for a vehicle according to various embodiments of the present invention.
Figure 2:
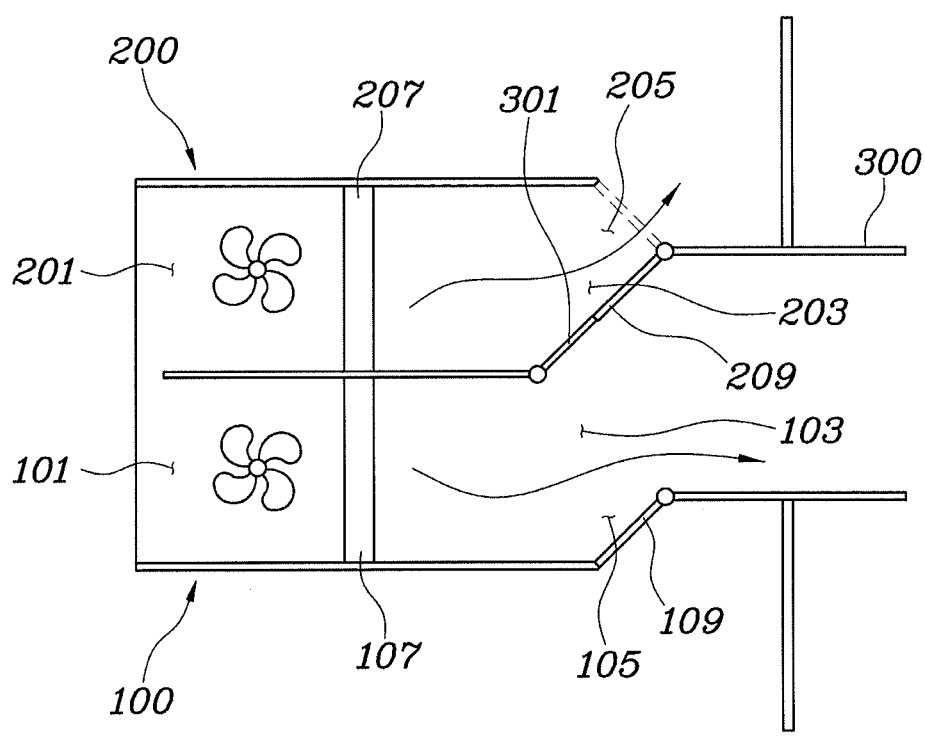
FIG. 2 is an operational view of the air conditioning system for a vehicle according to various embodiments of the present invention in a maximum cooling mode.
Figure 3:
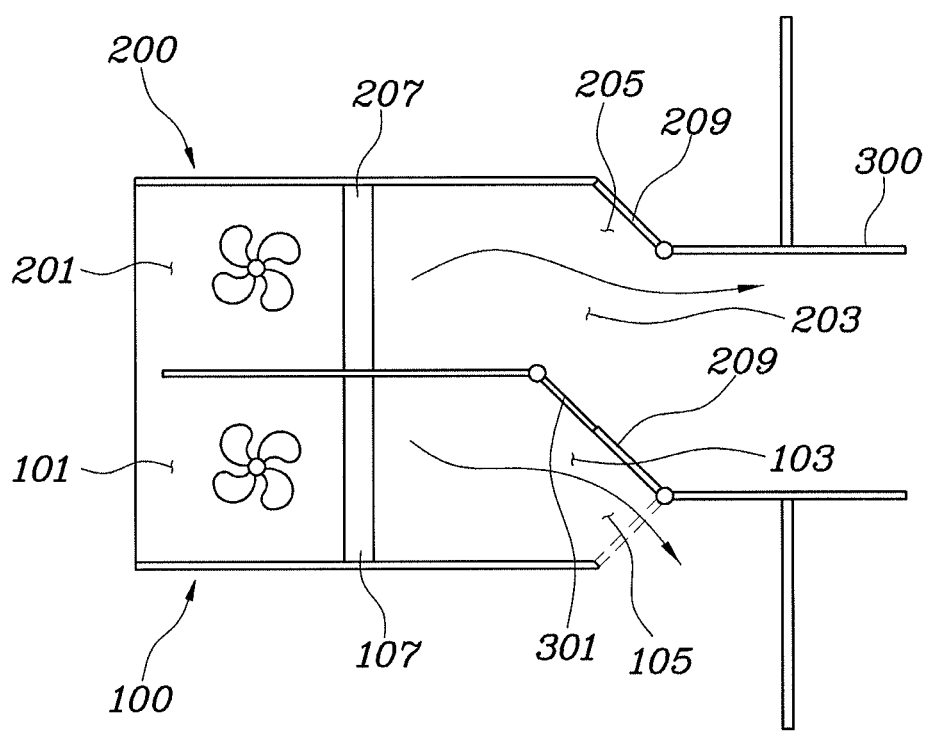
FIG. 3 is an operational view of the air conditioning system for a vehicle according to various embodiments of the present invention in a maximum heating mode.

FIG. 1 is a view illustrating a configuration of an air conditioning system for a vehicle according to various embodiments of the present invention, FIG. 2 is an operational view of the air conditioning system for a vehicle according to various embodiments of the present invention in a maximum cooling mode, and FIG. 3 is an operational view of the air conditioning system for a vehicle according to various embodiments of the present invention in a maximum heating mode.

An air conditioning system according to various embodiments of the present invention includes a cooling duct 100 provided with a cooling duct inlet 101 at a first end thereof, and a cooling duct indoor outlet 103 and a cooling duct outdoor outlet 105 at a second end thereof, and an evaporation core 107 disposed therein, a heating duct 200 provided with a heating duct inlet 201 at a first end thereof, and a heating duct indoor outlet 203 and a heating duct outdoor outlet 205 at a second end thereof, and a condenser 207 disposed therein, an extension duct 300 extending from both the cooling duct indoor outlet 103 and the heating duct indoor outlet 203, and inducing (channeling) air supplied from both the cooling duct indoor outlet 103 and the heating duct indoor outlet 203 to a passenger compartment, and a passage control door 301 provided at an indoor outlet end portion of a partition wall between the cooling duct 100 and the heating duct 200.

The air conditioning system may further include a cooling duct exhaust control door 109 provided between the indoor outlet and the outdoor outlet of the cooling duct 100, and controlling an outflow amount of air, and a heating duct exhaust control door 209 provided between the indoor outlet and the outdoor outlet of the heating duct 200, and controlling an outflow amount of air.

Referring to FIG. 1, the cooling duct 100 is provided with the cooling duct inlet 101 at the first end thereof, and provided with the cooling duct indoor outlet 103 and the cooling duct outdoor outlet 105 at the second end thereof, and the evaporation core 107 is disposed in the cooling duct 100. The heating duct 200 is provided with the heating duct inlet 201 at the first end thereof, and the heating duct indoor outlet 203 and the heating duct outdoor outlet 205 at the second end thereof, and the condenser 207 is disposed in the heating duct 200. The extension duct 300 is for supplying air conditioned in the cooling duct 100 and the heating duct 200 to a passenger compartment, and is provided extending from both the cooling duct indoor outlet 103 and the heating duct indoor outlet 203. The passage control door 301 is rotatably provided at the indoor outlet end portion of a partition wall between the cooling duct 100 and the heating duct 200.

As described above, the cooling duct 100 and the heating duct 200 are separately provided in the form of separated spaces so as to reduce interference between conditioned airs thereof, and thereby it is possible to improve efficiency of the air conditioning apparatus by preventing cooled air from being reheated or by preventing heated air from being recooled. Further, the cooling duct 100 or the heating duct 200 is configured such that an outlet thereof is divided into an indoor outlet and an outdoor outlet, and the cooling duct exhaust control door 109 and the heating duct exhaust control door 209 are provided to control the indoor outlet and the outdoor outlet, whereby it is possible not only to supply conditioned air to a passenger compartment but also to discharge conditioned air to the outside when necessary.

The evaporation core 107 and the condenser 207, along with a compressor and an expansion valve, may be connected to one refrigerant passage.

In the conventional vehicle, in order to heat the air, a coolant that cools an engine by absorbing engine heat while circulating around the engine is used as a heat source, and in order to cool the air, refrigerants that circulate through the evaporation core 107, the compressor, the condenser 207, and the expansion valve are used. However, in eco-friendly vehicles, such as electric vehicles or hybrid vehicles, a positive temperature coefficient (PTC) heater is used because the engine coolant, as a heat source, is not supplied or is supplied having insufficient heat.

However, when the PTC heater, as a heat source, is used or a water pump is used to circulate coolant, battery energy is consumed, and accordingly mileage is lowered in eco-friendly vehicles that use battery as a driving energy source.

Thus, in various embodiments of the present invention, in the process where refrigerants that are conventionally used to cool the air circulate through the refrigerant line, both a temperature rise range and a temperature fall range of the refrigerants are intended to be used for air conditioning. To be more specific, in the refrigerant line that is conventionally used for cooling, the evaporation core 107 for cooing the air is used as before, and while heat of high temperature and high pressure refrigerants having passed through the compressor is conventionally simply discharged as passing through the condenser 207, the air heated when the heat is discharged is used to heat air.

Further, in the above air conditioning system, when conditioning air, cooled air and heated air are always generated, but various embodiments of the present invention are configured such that ducts for cooling and heating are separately provided, so it is possible to selectively supply cooled air and heated air to a passenger compartment, and thus various embodiments of the present invention are optimized along with a structure of an air conditioning apparatus of the various embodiments of the present invention.

The cooling duct exhaust control door 109 may be disposed at a junction between the cooling duct 100 and the extension duct 300, and the heating duct exhaust control door 209 may be disposed at a junction between the heating duct 200 and the extension duct 300.

When the cooling duct exhaust control door 109 is operated to close the cooling duct indoor outlet 103 and the passage control door 301 is operated to close the cooling duct indoor outlet 103, the cooling duct exhaust control door 109 in cooperation with the passage control door 301 may close the cooling duct indoor outlet 103.

In various embodiments, the air conditioning system may further include a controller 400 controlling motions of the cooling duct exhaust control door 109, the heating duct exhaust control door 209, and the passage control door 301, wherein in a maximum heating mode, the controller 400 controls the passage control door 301 to close the cooling duct indoor outlet 103, controls the cooling duct exhaust control door 109 to close the cooling duct indoor outlet 103, and controls the heating duct exhaust control door 209 to close the heating duct outdoor outlet 205.

Referring to FIG. 3, the passage control door 301, along with the cooling duct exhaust control door 109 or the heating duct exhaust control door 209, closes the cooling duct indoor outlet 103 or the heating duct indoor outlet 203 by a rotating motion. The cooling duct indoor outlet 103 and the heating duct indoor outlet 203 may be opened or closed by controlling sizes of the cooling duct exhaust control door 109 and the heating duct exhaust control door 209. However, in this case, a passage is narrowed in the process where the cooling duct 100 and the heating duct 200 are connected to one extension duct 300, and thereby loss of air volume and noise may occur.

Thus, in various embodiments of the present invention, the passage control door 301 is provided to control a diameter of the passage connected from the cooling duct 100 or from the heating duct 200 to the extension duct 300, and thereby it is possible to prevent loss of air volume and occurrence of noise.

To be more specific, in a maximum heating mode, the passage control door 301 and the cooling duct exhaust control door 109 are rotated to close the cooling duct indoor outlet 103 of the cooling duct 100. Here, the passage control door 301 is rotated to expand a diameter of a portion of the passage connected from the heating duct 200 to the extension duct 300, and thereby it is possible to prevent loss of air volume and occurrence of noise.

When the heating duct exhaust control door 209 is operated to close the heating duct indoor outlet 203 and the passage control door 301 is operated to close the heating duct indoor outlet 203, the heating duct exhaust control door 209 in cooperation with the passage control door 301 may close the heating duct indoor outlet 203.

In various embodiments, the air conditioning system may further include a controller 400 controlling motions of the cooling duct exhaust control door 109, the heating duct exhaust control door 209, and the passage control door 301, in which in a maximum cooling mode, the controller 400 controls the passage control door 301 to close the heating duct indoor outlet 203, controls the heating duct exhaust control door 209 to close the heating duct indoor outlet 203, and controls the cooling duct exhaust control door 109 to close the cooling duct outdoor outlet 105.

In a maximum cooling mode, the air conditioning system is operated similar to in a maximum heating mode. Referring to FIG. 2, in a maximum cooling mode, the passage control door 301 and the heating duct exhaust control door 209 are rotated to close the heating duct indoor outlet 203 of the heating duct 200. Here, the passage control door 301 is rotated to expand a diameter of a portion of the passage connected from the cooling duct 100 to the extension duct 300, and thereby it is possible to prevent loss of air volume and occurrence of noise.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air conditioning system for a vehicle, the air conditioning system comprising:
   a cooling duct provided with a cooling duct inlet at a first end of the cooling duct, and a cooling duct indoor outlet and a cooling duct outdoor outlet at a second end of the cooling duct, and including an evaporation core disposed in the cooling duct;
   a heating duct provided with a heating duct inlet at a first end of the heating duct, and a heating duct indoor outlet and a heating duct outdoor outlet at a second end of the heating duct, and including a condenser disposed in the heating duct;
an extension duct extending from both the cooling duct indoor outlet and the heating duct indoor outlet, and channeling air supplied from both the cooling duct indoor outlet and the heating duct indoor outlet to a passenger compartment;
a passage control door provided at an indoor outlet end portion of a partition wall between the cooling duct and the heating duct;
a cooling duct exhaust control door provided between the indoor outlet and the outdoor outlet of the cooling duct, and controlling an outflow amount of cooled air; and
a heating duct exhaust control door provided between the indoor outlet and the outdoor outlet of the heating duct, and controlling an outflow amount heated of air,
wherein when the cooling duct exhaust control door is operated to close the cooling duct indoor outlet and the passage control door is operated to close the cooling duct indoor outlet, the cooling duct exhaust control door in cooperation with the passage control door closes the cooling duct indoor outlet.

2. The air conditioning system of claim 1, wherein the evaporation core and the condenser, along with a compressor and an expansion valve, are connected to one refrigerant passage.

3. The air conditioning system of claim 1, wherein
the cooling duct exhaust control door is disposed at a junction between the cooling duct and the extension duct; and
the heating duct exhaust control door is disposed at a junction between the heating duct and the extension duct.

4. The air conditioning system of claim 3, wherein when the heating duct exhaust control door is operated to close the heating duct indoor outlet and the passage control door is operated to close the heating duct indoor outlet, the heating duct exhaust control door in cooperation with the passage control door closes the heating duct indoor outlet.

5. The air conditioning system of claim 1, further comprising:
a controller controlling opening and closing motions of the cooling duct exhaust control door, the heating duct exhaust control door, and the passage control door, wherein
in a maximum heating mode, the controller controls the passage control door to close the cooling duct indoor outlet, controls the cooling duct exhaust control door to close the cooling duct indoor outlet, and controls the heating duct exhaust control door to close the heating duct outdoor outlet.

6. The air conditioning system of claim 4, further comprising:
a controller controlling opening and closing motions of the cooling duct exhaust control door, the heating duct exhaust control door, and the passage control door, wherein
in a maximum cooling mode, the controller controls the passage control door to close the heating duct indoor outlet, controls the heating duct exhaust control door to close the heating duct indoor outlet, and controls the cooling duct exhaust control door to close the cooling duct outdoor outlet.

* * * * *